(12) United States Patent
Mizu et al.

(10) Patent No.: US 7,935,683 B2
(45) Date of Patent: May 3, 2011

(54) POLYSACCHARIDE-CARBON NANOTUBE COMPLEX

(75) Inventors: Masami Mizu, Sakai (JP); Seiji Shinkai, Fukuoka (JP); Teruaki Hasegawa, Fukuoka (JP); Munenori Numata, Fukuoka (JP); Tomohisa Fujisawa, Fukuoka (JP); Kazuo Sakurai, Himeji (JP)

(73) Assignees: Japan Science and Technology Agency, Saitama (JP); Mitsui Sugar Co., Ltd., Tokyo (JP)

( * ) Notice: Subject to any disclaimer, the term of this patent is extended or adjusted under 35 U.S.C. 154(b) by 353 days.

(21) Appl. No.: 11/579,403

(22) PCT Filed: May 16, 2006

(86) PCT No.: PCT/JP2005/008352
§ 371 (c)(1),
(2), (4) Date: Apr. 28, 2008

(87) PCT Pub. No.: WO2005/108482
PCT Pub. Date: Nov. 17, 2005

(65) Prior Publication Data
US 2008/0242854 A1   Oct. 2, 2008

(30) Foreign Application Priority Data

May 7, 2004   (JP) .................................. 2004-138260

(51) Int. Cl.
*A61K 31/715*   (2006.01)
*A61K 31/716*   (2006.01)
*C08B 37/00*   (2006.01)
*B82B 1/00*   (2006.01)
*B82B 3/00*   (2006.01)

(52) U.S. Cl. ................... 514/54; 536/123.1; 536/123.12; 977/753; 977/750

(58) Field of Classification Search ........................ None
See application file for complete search history.

(56) References Cited

FOREIGN PATENT DOCUMENTS
JP   2003-339569   12/2003

OTHER PUBLICATIONS

Numata et al., "Curdlan and Schizophyllan (beta-1,3-Glucans) can Entrap Single-wall Carbon Nanotubes in Their Helical Superstructure" Chemistry Letters (2004) vol. 33 No. 3, pp. 232-233.*
Table of contents for Chemistry Letters vol. 33 No. 3, published Jan. 26, 2004.*
Hasegawa et al., "Single-walled carbon nanotubes acquire a specific lectin-affinity through supramolecular wrapping with lactose-appended schizophyllan" Chem. Communications (2004) pp. 2150-2151.*
Stobinski et al., "Single-walled carbon nanotube—amylopectin complexes" Carbohydrate Polymers (2003) vol. 51, pp. 311-316.*
P. M. Ajayan, "Nanotubes from Carbon," Chemical Reviews (ACS Publications) 1999, 99, 1787-1799.
Sun, et al., "Functionalized Carbon Nanotubes: Properties and Applications," Accounts of Chemical Research, 2002, 35, 1096-1104.
Niyogi, et al., "Chemistry of Single-Walled Carbon Nanotubes," Acc. Chem. Res. 2002, 35, 1105-1113.
Pantarotto, et al., "Translocation of bioactive peptides across cell membranes by carbon nanotubes," Chem. Commun. 2004, 16-17.
Santucci, et al, "NO2 and CO gas adsorption on carbon nanotubes: Experiment and theory," Journal of Chemical Physics, 2003, 119, 10904-10910.
Chen, et al. "Noncovalent functionalization of carbon nanotubes for highly specific electronic biosensors," Natl. Acad. Sci. U.S.A. 2003, 100, 4984-4989.
Besteman, et al. "Enzyme-Coated Carbon Nanotubes as Single-Molecule Biosensors," Nano Lett. 2003, 3, 727-730.
Matsuura, et al. "Lectin-mediated Supramolecular Junctions of Galactose-derivatized Single-walled Carbon Nanotube," Chemistry Letters, 2003, 32, 212-213.
Guldi, et al. "Single-Wall Carbon Nanotube—Ferrocene Nanohybrids: Observing Intramolecular Electron Transfer in Functionalized SWNTs," Angew Chem Int Ed Engl., 2003, 42, 4206-4209.
Bianco, et al. "Can Carbon Nanotubes be Considered Useful Tools for Biological Applications?" Advanced Materials, 2003, 15, 1765-1768.
Artyukhin, et al. "Layer-by-Layer Electrostatic Self-Assembly of Polyelectrolyte Nanoshells on Individual Carbon Nanotube Templates," Langmuir 2004, 20, 1442-1448.
Petrov, et al. "Noncovalent functionalization of multi-walled carbon nanotubes by pyrene containing polymers," Chem. Commun. 2003, 2904-2905.
Star, et al. "Starched Carbon Nanotubes," Angew Chem Int Ed Engl., 2002, 41, 2508-2512.
Lii, et al. "Single-walled carbon nanotube—potato amylase complex," Carbohydr. Polym., 2003, 51, 93-98.
Numata, et al. "Curdlan and Schizophyllan (β-1,3-Glucans) can Entrap Single-wall Carbon Nanotubes in Their Helical Superstructure," Chemistry Letters, 2004, 33, 232-233.
Martin, et al. "Molecular Characterization of Self-Assembly of Fungal Hydrophobins and an Associated Polysaccharide from Aqueous Media," Am. Chem. Soc. Poly. Prep. 1997, 38, 253-254.
Sun, et al. "Design and Synthesis of Biotin Chain-Terminated Glycopolymers for Surface Glycoengineering," Journal of the American Chemical Society, 2002, 124, 7258-7259.
Numata, et al. "β-1,3-Glucan (Schizophyllan) Can Act as a One-Dimensional Host for Creation of Novel Poly(aniline) Nanofiber Structures," Organic Letters, 6(24), 4447-4450 (2004).
Li, et al. "Self-Assembly of Supramolecular Chiral Insulated Molecular Wire," J. Am. Chem. Soc., 127, 4548-4549 (2005).
Numata, et al. "Inclusion of Cut and As-Grown Single-Walled Carbon Nanotubes in the Helical Superstructure of Schizophyllan and Curdlan (β-1, 3-Glucans)" Journal of the American Chemical Society, 127(16), 5875-5884 (2005).
* cited by examiner

*Primary Examiner* — Eric S Olson
(74) *Attorney, Agent, or Firm* — Fay Sharpe LLP

(57) ABSTRACT

Disclosed is a complex which comprises a carbon nanotube and a modified polysaccharide having a backbone chain with the side thereof being introduced with monosaccharide or oligosaccharide residues. The polysaccharide is preferably β-1,3-glucan. The complex is prepared by admixing a solution of the modified polysaccharide dissolved in an aprotic polar solvent or a strong alkali solution with an aqueous dispersion of the carbon nanotube, and incubating the mixture.

8 Claims, 14 Drawing Sheets

L : |—s—|

L: |—s-s—|

POLYSACCHARIDE-CARBON NANOTUBE COMPLEX

This application claims the priority of JP 2004-138260, filed on May 7, 2004, and PCT/JP2005/008352, filed on May 6, 2005.

TECHNICAL FIELD

The present invention relates to a novel polysaccharide-carbon nanotube complex possessing characteristic features such as a biocompatibility.

BACKGROUND ART

Recently new trials have been active to fabricate microelectronic circuits based on the self-organization ability of low molecular compounds, in place of the conventional lithographic method which is approaching to its limitations. For example, there is made an attempt to fabricate a microelectronic circuit, wherein double-stranded nucleic acids, which were revealed to be electrically conductive, are counted as molecular-sized electric wires and organized to form a complex of the nucleic acids complementary to each other.

In such trend, attention has been focused on carbon nanotube as the fourth carbon allotrope following diamond, graphite and fullerene. Carbon nanotube is defined as cylindrically rolled graphen sheet(s) and broadly classified, depending upon the mode of cylindrical rolling, into single-walled and multi-walled carbon nanotubes which have proved to exhibit a number of interesting properties [P. M. Ajayan, Chem. Rev. 1999, 99, 1787 (Non-patent reference 1); Y.-P. Sun, K. Fu, Y. Lin, W. Huang, Acc. Chem. Res. 2002, 35, 1096 (Non-patent reference 2); S. Niyogi, M. A. Hamon, H. Hu, B. Zhao, P. Bhowmik, R. Sen, M. E. Itkis, R. C. Haddon, Acc. Chem. Res. 2002, 35, 1105 (Non-patent reference 3)].

For example, although single-walled carbon nanotubes mostly have a diameter in the range of 0.8 to 1.4 nm and are therefore considered to be an extremely fine linear molecule of a quantum size, they exhibit a very high tensile strength of approx, several tens of GPa. It is also theoretically predicted that single-walled carbon nanotube will not break even under tension at gradually and continuously increasing strength but finally form are array structure of carbon atoms whose ends are closed. Furthermore it has been proved that single-walled carbon nanotubes are highly resistant even to flexure stress. For example, while carbon fibers or metals under flexure stress will break up beyond the elastic limit, it is found through transmission electron microscopic observation and other means that single-walled carbon nanotubes under flexure stress just transform to form a waved structure toward the compression side. The carbon nanotubes also feature restoration from the transformation. It has been thus elucidated single-walled carbon nanotubes are hard to be ruptured and are highly flexible.

Single-walled carbon nanotubes possess a very low density of 1.33 to 1.40 $g/cm^2$ owing to the hollow structure and thus remarkably lighter than aluminum which has a density of 2.7 $g/cm^3$ and is a representative lightweight and high-strength material. Taking the mechanical strength into consideration, single-walled carbon nanotubes can be an ideal material in the fields where there are demanded lightweight and highly-strong materials.

In addition to the excellent mechanical properties as mentioned above, single-walled carbon nanotubes has turned out to exhibit electrical conductivity due to the continuous π-electron cloud. Depending upon the type of the structure, single-walled carbon nanotubes are classified into three isomers, i.e. zigzag, chiral and armchain ones, and it is known that the respective isomers exhibit metallic or semiconductive conductivity owing to the subtle difference in the structure.

Recently it has been elucidated that mass transportation can be carried out through the hollow of a single-walled carbon nanotube and also that carbon nanotubes can be a carrier for delivering a drug into cells [D. Pantarotto, J.-P. Briand, M. Prato, A. Bianco, Chem. Commun. 2004, 16 (Non-patent reference 4)].

Because of a variety of characteristic properties as mentioned above, carbon nanotubes are a promising novel material which may be applicable not only as a conductive substance for the next generation of microelectronic circuits but also as materials in the wide range of fields including biochemistry.

For example, it has been shown that the electrical conductivity of a single-walled carbon nanotube drastically changes depending upon the circumstance, such as adsorption with a diatomic molecule or a protein onto the carbon nanotube, and thus, taking advantage of such phenomena, single-walled carbon nanotubes are expected to be a sensor for detecting a target substance [S. Santucci, S. Picozzi, F. Di Gregorio, L. Lozzi, C. Cantalini, L. Valentini, J. M. Kenny, B. Delly, J. Chem. Phys. 2003, 119, 10904 (Non-patent reference 5); R. J. Chen, S. Bangsaruntip, K. A. Drouvalakis, N. W. S. Kam, M. Shim, Y. M. Li, W. Kim, P. J. Utz, H. J. Dai, Proc. Natl. Acad. Sci. U.S.A. 2003, 100, 4984 (Non-patent reference 6); K. Besteman, J. Lee, F. G. M. Wiertz, H. A. Heering, C. Dekker, Nano Lett. 2003, 3, 727 (Non-patent reference 7)].

However, carbon nanotubes are composed of only carbon atoms, and therefore have a high autocohesion and are insoluble in all types of solvents including water and organic solvents. Carbon nanotubes will not interact selectively with specific types of molecules, because they have no molecular-recognition sites.

Extensive studies are being made on the introduction of molecular-recognition sites into carbon nanotubes through the direct chemical modification thereof, for improving the dispersability of the carbon nanotubes in solvents or for developing a sensor system based on the carbon nanotubes. For example, polyether groups, peptides saccharide chains or the like can be introduced into a carbon nanotube by oxidization of the carbon nanotube through supersonic treatment in the mixed acid, followed by amidating the resultant carboxyl groups [Matsuura, K. Hayashi, N. Kimizuka, Chem. Lett. 2003, 32, 212 (Non-patent reference 8)].

Methods are widely used in which a carbon nanotube is directly modified through a cycloaddition reaction, without the above-mentioned treatment in the mixed acid [D. M. Guldi, M. Marcaccio, D. Paolucci, F. Paolucci, N. Tagmatarchis, D. Tasis, E. Vazques, M. Prato, Angew. Chem. Int. Ed. 2003, 42, 4206 (Non-patent reference 9); A. Bianco, M. Prato, Adv. Mater. 2003, 15, 1765 (Non-patent reference 10)].

Although great advances are thus being made in direct chemical modification of carbon nanotubes, the method suffers from a drawback in that it will inevitably degrade the inherent properties of the carbon nanotubes such as electrical conductivity, stiffness on linearity because the chemical modification will necessarily disturb the π-electron system of the carbon nanotube. Furthermore it is very difficult to introduce a highly densed functional group into carbon nanotubes through a direct chemical modification method, because the higher degree of modification will result in the higher degree of lowering in the electric conductivity. For solving these issues, there are demanded methods of functionalizing carbon nanotubes which methods are convenient, versatile and nondestructive without damaging the electrochemical properties of the carbon nanotubes.

On the other hand, a variety of covering or coating material have been studied in terms of the solubilization of carbon nanotubes. For example, it is reported that a pyrene-based compound having an amino group adsorbs on the surface of a carbon nanotube due to the interaction between the pyrene and the carbon nanotube, thereby making the carbon nanotube water-soluble because of the cationic property derived from the amino group [A. B. Artyukhin, O. Bakajin, P. Stroeve, A. Noy, Langmuir 2004, 20, 1442 (Non-patent reference 11)].

Similarly, cationic pyrene-containing polyacrylamide adsorbs onto a carbon nanotube due to strong interaction between the pyrene and the carbon nanotube, thereby making the carbon nanotube soluble in water because of the negative electricity present in the polymer chain [P. Petrov, F. Stassin, C. Pagnoulle, R. Jerome, Chem. Commun. 2003, 2904 (Non-patent reference 12)].

It has been also elucidated that amilose, a naturally occurring polysaccharide, complexes with a single-walled carbon nanotube, thereby solubilizing the carbon nanotube [A. Star, D. W. Steuerman, J. R. Heath, J. F. Stoddart, Angew. Chem. Int. ed. 2002, 41, 2508 (Non-patent reference 14); C. Lii, L. Stobinski, P. Tomasik, C. Liao. Carbohydr. Polym., 2003, 51, 93 (Non-patent reference 15)].

However, in the above-mentioned studies with respect to the interactions between the covering or coating materials and the carbon nanotubes, emphasis are put only on the solubilization of the carbon nanotubes. No attempts have been made, by making use of the covering or coating phenomena, to provide assembled functional groups, such as molecular-recognition or electronically functional groups, with the surface of a carbon nanotube.

Recently the present inventors and others have found an interesting phenomena that a carbon nanotube is coated with schizophyllan or curdlan, naturally occurring β-1,3-glucan, in a spiral fashion. It has been also found that the use of schizophyllan enables the dispersion of a larger amount of carbon nanotubes in an aqueous solvent for a longer period of time, as compared with the use of another natural polysaccharide such as amylose. Thus, we filed a patent application for a novel process of solubilization of carbon nanotubes by using schizophyllan and other β-1,3-glucans. The coating of carbon nanotubes with the harmless natural polysaccharide will be a promising in vivo application of carbon nanotubes, particularly single-walled carbon nanotubes [M. Numata, M. Asai, K. Kaneko, T. Hasegawa, N. Fujita, Y. Kitada, K. Sakurai, S. Shinkai, Chem. Lett. 2004, 33, 232 (Non-patent reference 16); Japanese Patent Application No. 2003-339569 (Patent reference 1)].

The complex of a carbon nanotube with schizophyllan, a β-1,3-glucan, is very stable, as compared with that of a carbon nanotube with amylose, a α-1,4-glucan. Amylose is easily hydrolysed with a glucanase present in the human body, whereas the human body have no β-1,3-glucanase, i.e. enzymes which serves to hydrolyse β-1,3-glucans including schizophyllan. In view of these facts, the coating of carbon nanotubes with schizophyllan will provide a solubilization system suitable in in-vivo or biochemical applications.

DISCLOSE OF THE INVENTION

The Problems to be Solved by the Invention

The object of the present invention is to provide novel useful materials derived from carbon nanotubes, which serves, for example, to selectively interact with specific proteins cells, without damaging the inherent properties of the carbon nanotube.

Means for Solving the Problems

The present invention is based on introducing cell- or protein-recognizing saccharide into the side of a polysaccharide, and coating (clathrating) a carbonanotube with such modified polysaccharide.

Thus, according to the present invention there is provided a complex which comprises a carbon nanotube and a modified polysaccharide, having a backbone chain with the side thereof being introduced with monosaccharide or oligosaccharide residues.

BEST MODE FOR CARRYING OUT THE INVENTION

Figure 1A:
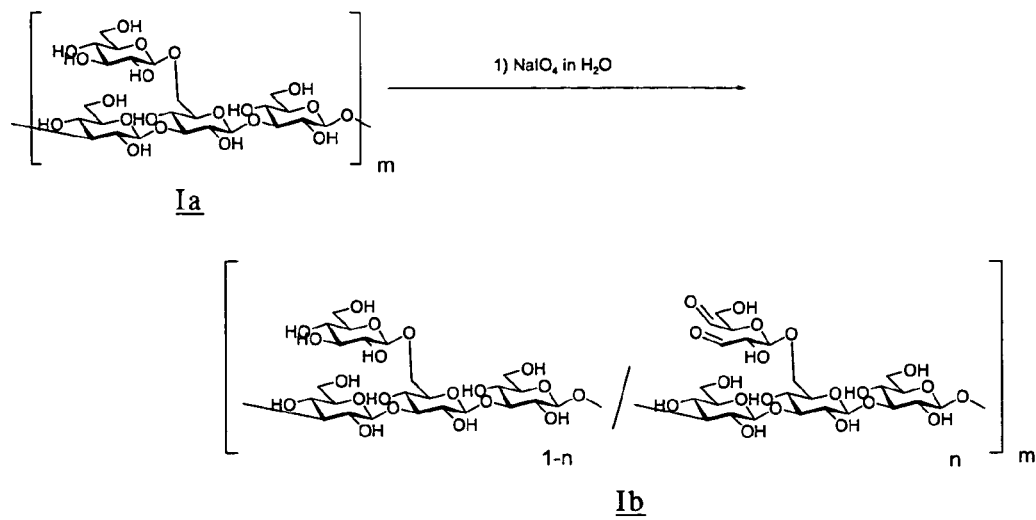
FIG. 1 illustrates a scheme for synthesizing the modified polysaccharide for use in the present invention.
Figure 1B:
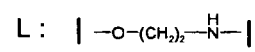
Figure 1B:
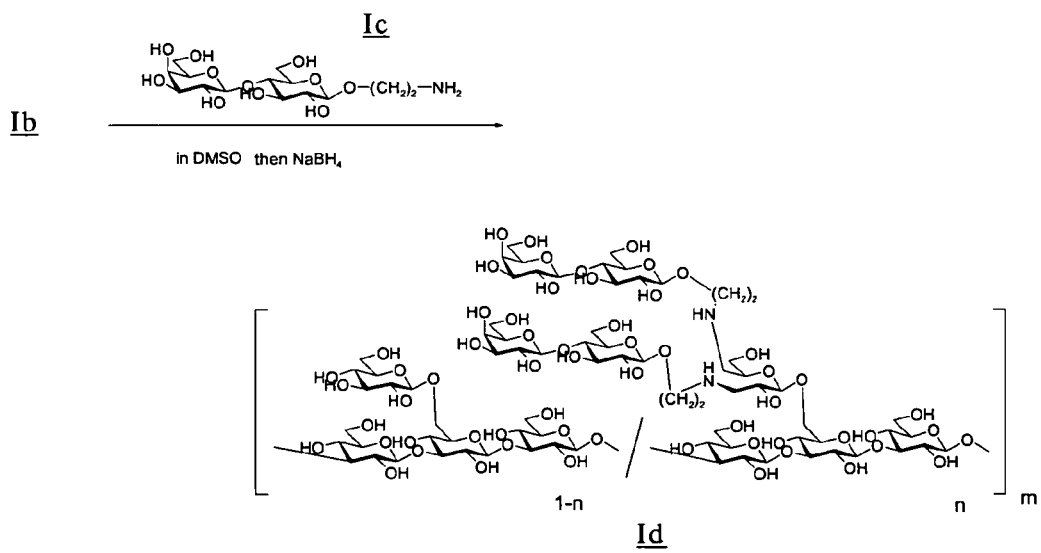
Figure 1C:
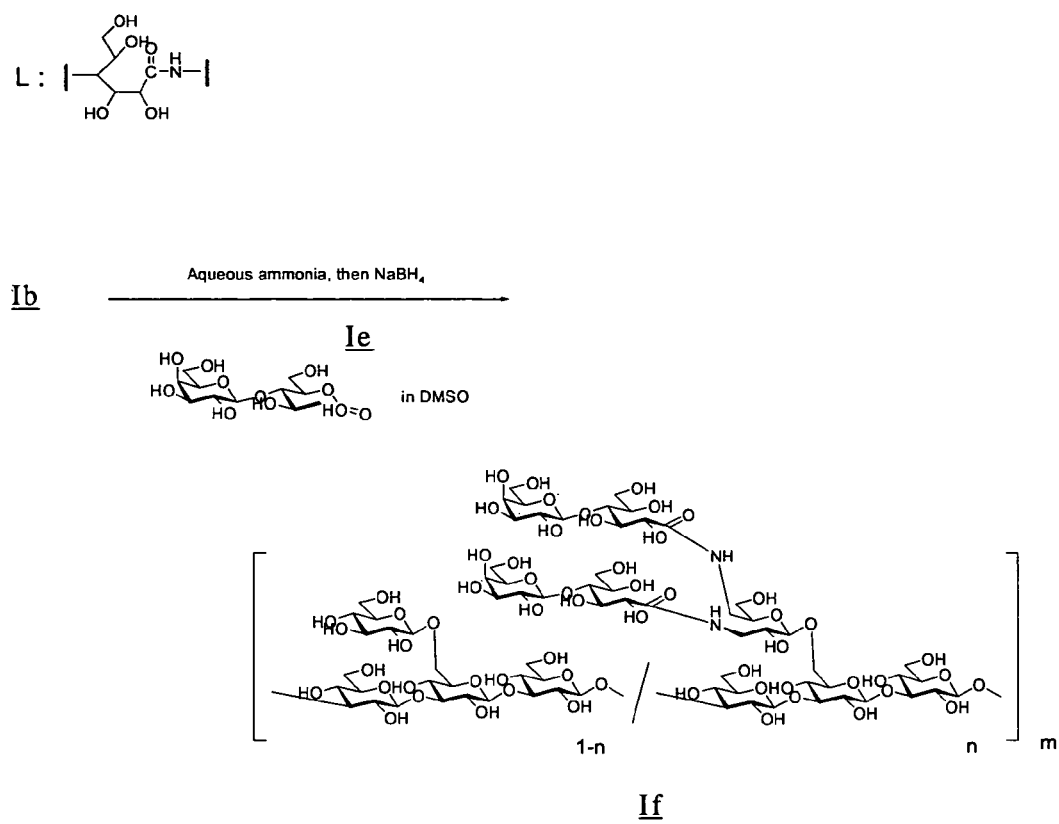
Figure 1D:
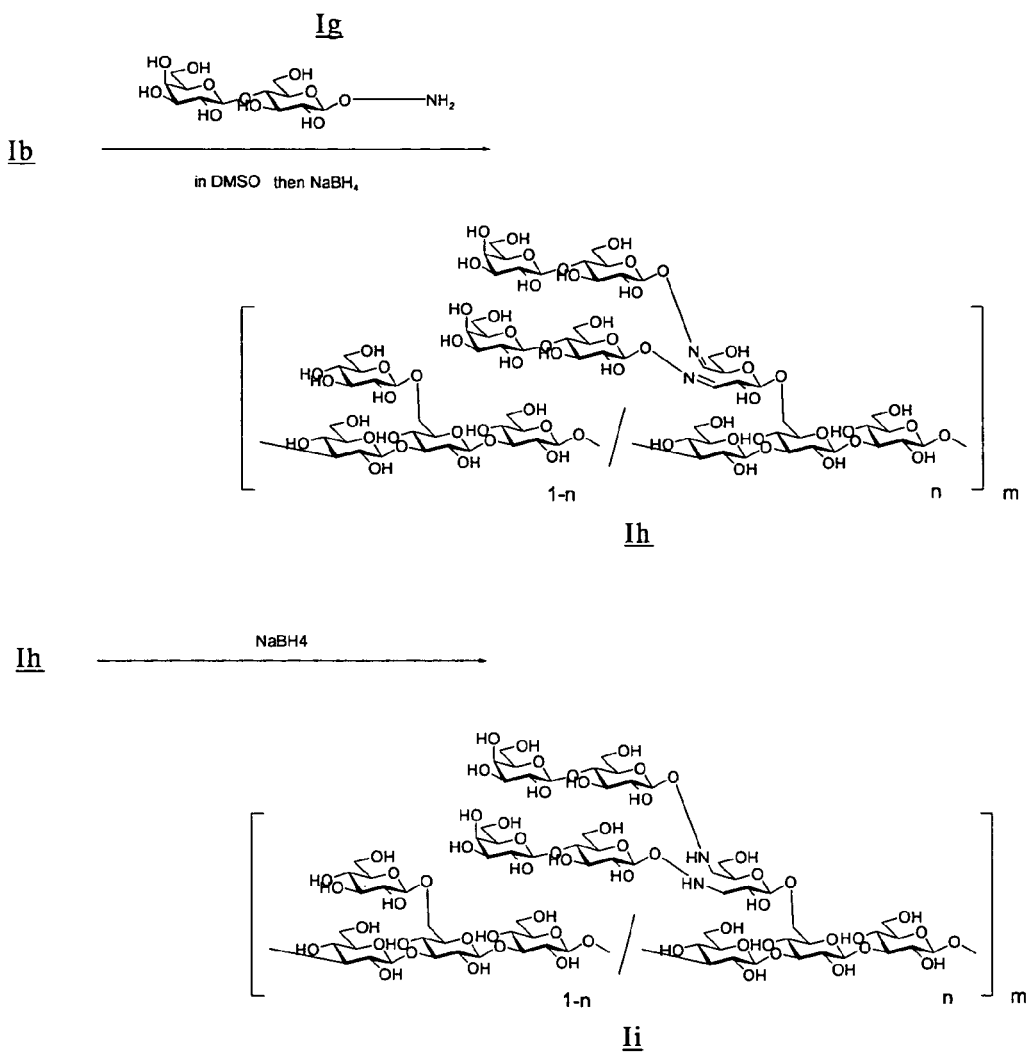
Figure 1E:
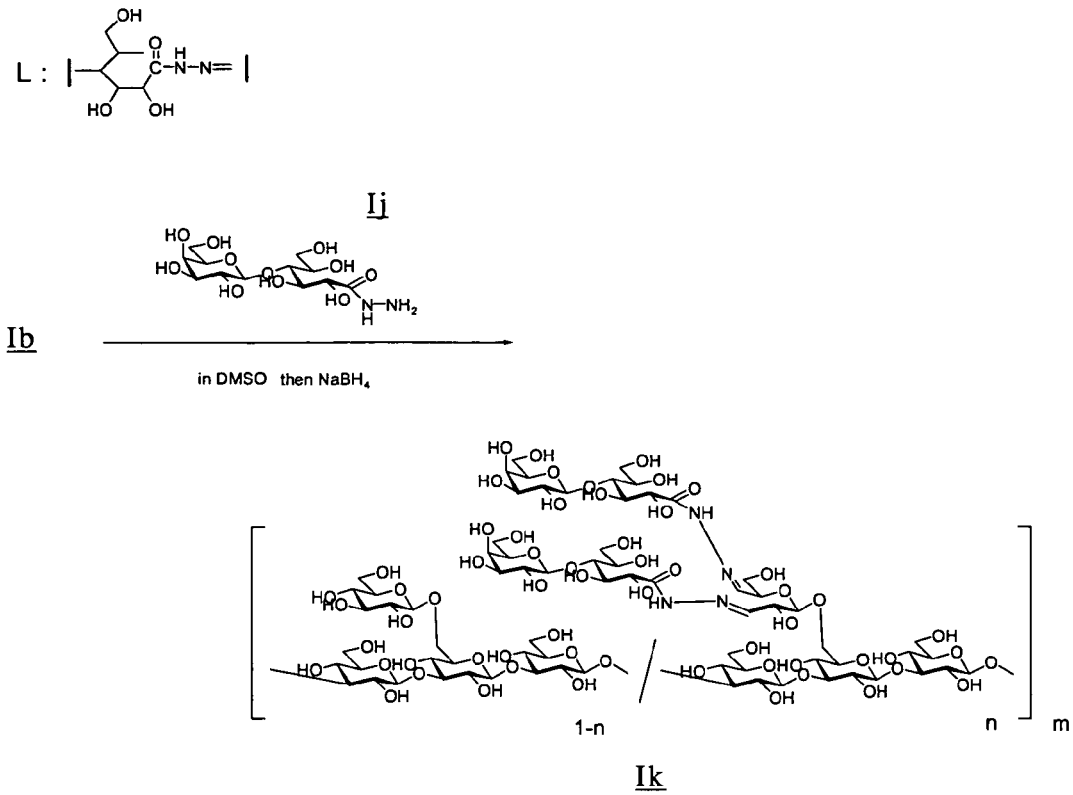
Figure 2A:
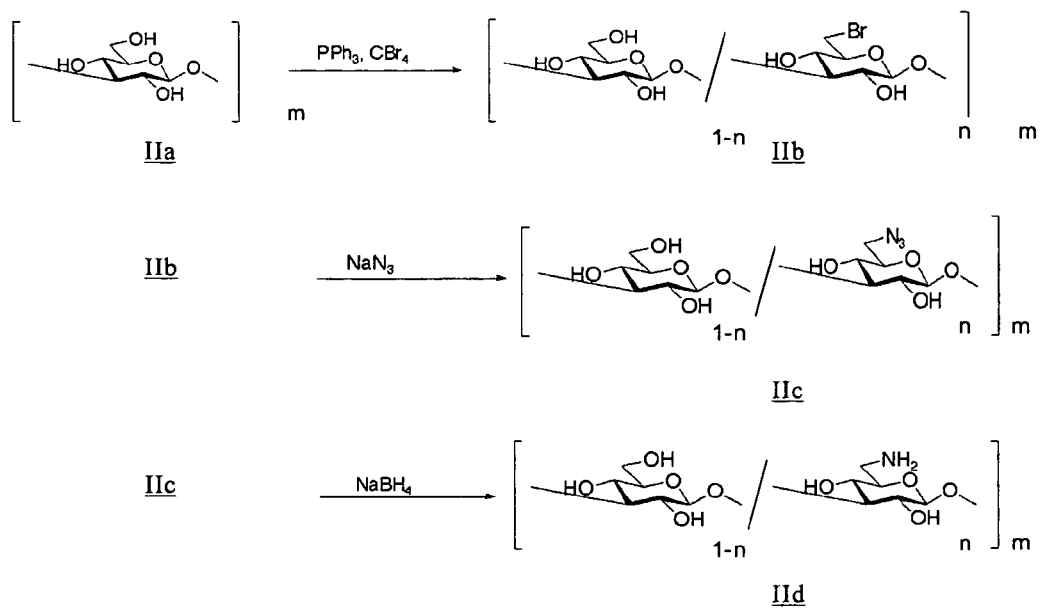
FIG. 2 illustrates another scheme for synthesizing the modified polysaccharide for use in the present invention.
Figure 2B:
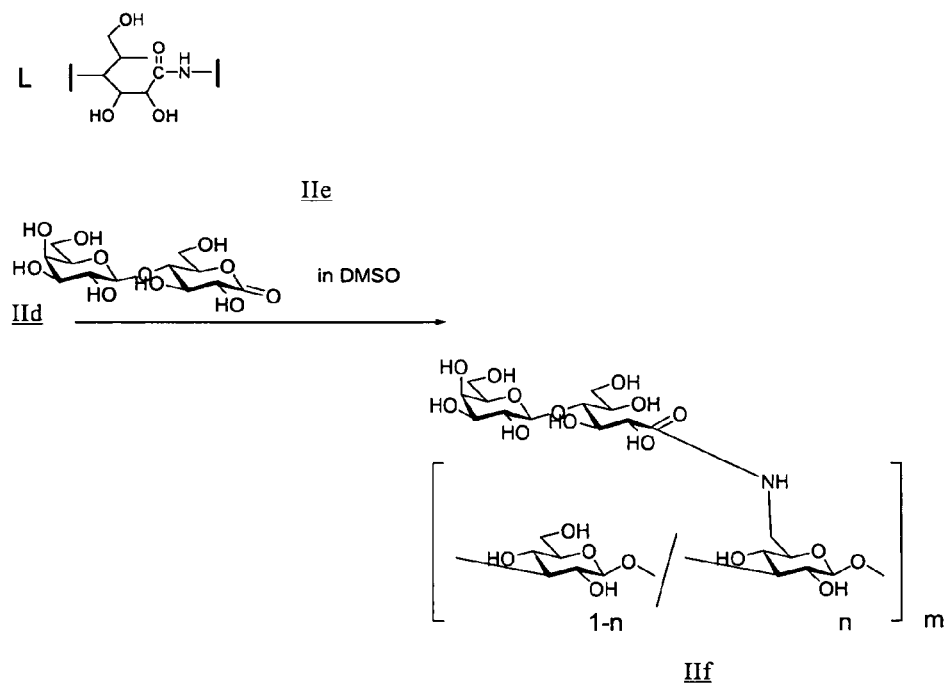
Figure 2C:
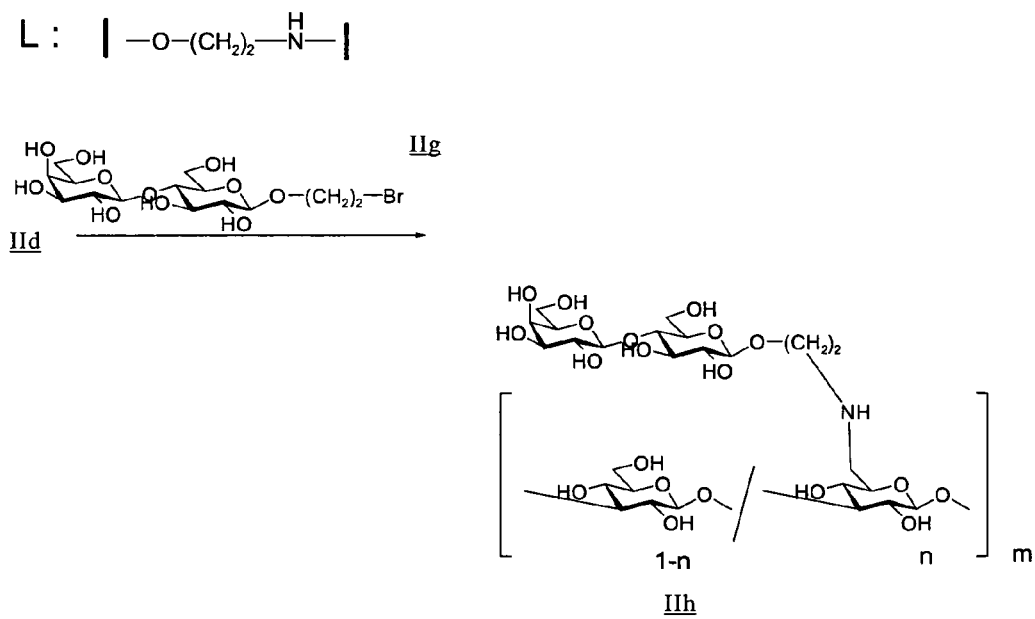
Figure 2D:
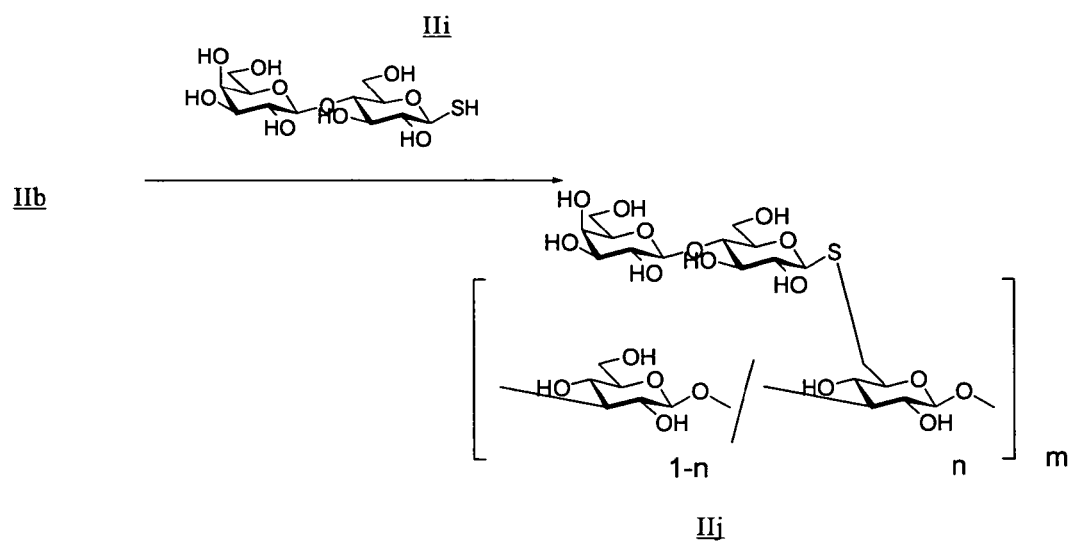
Figure 2E:
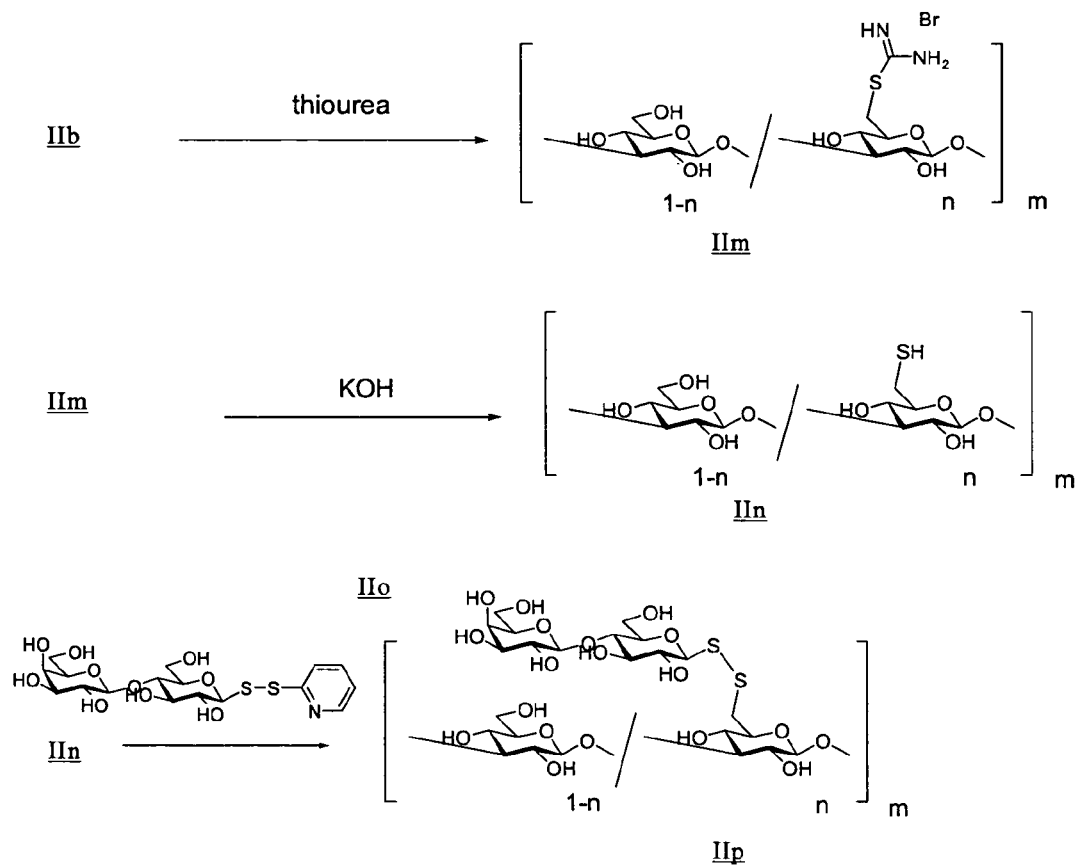

The term "modified polysaccharide" for composing a complex of the present invention means a polysaccharide, whose backbone chain has been externally introduced with monosaccharide or oligosaccharide residues into the side thereof.

As the starting polysaccharide, any saccharide can be basically applied as long as it can be introduced with a monosaccharide or oligosaccharide into the side of the backbone chain thereof, and it can be complexed with carbon nanotube. For example, while such polysaccharide as β-1,3-xylan or α-1,4-glucan (e.g. amilose) can be used, the most preferable polysaccharide is β-1,3-glucan.

β-1,3-glucan forms a complex, with carbon nanotube, which is particularly stable and of excellent solubility. Above all, schizophyllan is ensured for its safety as it has usage track record of an intramuscular injection for more than twenty years.

As well known, β-1,3-glucan is a polysaccharide in which the backbone chain is composed of β1,3 glucoside bonds. While there is known a β-1,3-glucan which has no side chain glucose (strictly, glucose residues), such as curdlan, or a small number of side chain glucose residues, such as pachyman, and such polysaccharides can be applied to the present invention, preferred is a β-1,3-glucan who has a considerable number of side chain glucose residues such as schizophyllan, lentinan and scleroglucan, of which schizophyllan is particularly preferred. As described later, these polysaccharides are advantageous in that they can be easily introduced with monosaccharide or oligosaccharide residues into the side chains thereof. With respect to the molecular weight of β-1, 3-glucan, the polysaccharide is required to have a reasonable length of molecule and thus a molecular weight of about 2000 or more will suffice for use in the invention.

As well known, carbon nanotube can be classified into single-walled carbon nanotube and multi-walled carbon nanotube. While the principle of the present invention is applicable to any types of the carbon nanotubes including the mixture thereof, the present invention is preferably applied to single-walled carbon nanotubes (which may be herein abbreviated as SWNTs). Thus, the following explanation will be made predominantly with reference to cases where the present invention is applied to SWNTs.

By the "monosaccharide ore oligosaccharide" to be introduced into the sides of the backbone chain of a polysaccharide typified by β-1,3-glucan, is referred to a variety of saccharides as described in the aforementioned and other literatures. Preferred examples include, but are not limited to, a monosaccharide selected from galactose, N-acetylgalactosamine, N-acetylglucosamine, glucose, fucose, sialic acid and lactose, and an oligosaccharide composed of such monosaccharide.

The abovementioned saccharides are essential (constituent saccharides present in living things, and it has been shown that they are involved in various molecular recognition phenomena in living things, such as impregnation, differentiation, cell adhesion and intercellular signaling. Most of the constituent saccharides are also known as recognition sites on the surfaces of cells, through which toxins, viruses and the like lock onto the host cells. For example, influenza viruses lock onto human bronchial cells by strongly recognizing sialic acid.

The complex of the present invention which comprises a carbon nanotube and a modified saccharide introduced with monosaccharide or oligosaccharide residues can be prepared in an easy manner: A solution of the modified saccharide (preferably β-1,3-glucan) dissolved in an aprotic polar solvent or a strong alkali solution is admixed with an aqueous dispersion of the carbon nanotube, followed by incubation of the resultant mixture (in case where a strong alkali solution is used, the incubation follows neutralization) to obtain the desired complex. Preferred examples of aprotic polar solvents include, but are not limited to, dimethyl sulfoxide (DMSO). Preferred examples of strong alkali solutions include, but are not limited to, an aqueous solution of sodium hydroxide. The incubation is preferably carried out at a temperature of 50° C. for two days.

It is known that β-1,3-glucan assumes a triple helix structure as it occurs naturally. The present inventors have found that such structure of β-1,3-glucan is unbound in an aprotic polar solvent (e.g. DMSO) or in a strong alkali solution (e.g. sodium hydroxide solution) to a single-stranded form, and further that transfer of the resultant into an aqueous neutral solution will restore the triple helix structure, and at that time, if a substance coexists, β-1,3-glucan will wind up or wrap the coexistent substance so that β-1,3-glucan takes the substance in the hydrophobic space defined by β-1,3-glucan by coating the substance [M. Numata, T. Hasegawa, T. Fujisawa, K. Sakurai, S. Shinkai, Org. Lett. 6(24), 4447-4450 (2004) (Non-patent reference 21); C. Li, M. Numata, Ah-Hyun Bae, K. Sakurai, S. Shinkai, J. Am. Chem. Soc., 127, 4548-4549 (2005) (Non-patent reference 22); M. Numata, M. Asai, K. Kaneko, T. Hasegawa, K. Sakurai, S. Shinkai, J. Am. Chem. Soc., 127(16), 5875-5884 (2005) (Non-patent reference 23)].

The aforementioned process for preparing the complex of the present invention is based upon such phenomenon. It is comprehended that the modified polysaccharide-carbon nanotube complex of the present invention is constructed in such form that the carbon nanotube is included in the interior space of the modified polysaccharide and bound with the backbone chain of the modified polysaccharide through the hydrophobic interaction, while there are present, on the exterior surface of the polysaccharide, monosaccharide or oligosaccharide residues which are capable of recognizing proteins or cells. No direct chemical modifications are provided to the carbon nanotube in the complex of the present invention.

In preparing the modified polysaccharide composing the complex of the present invention, various known reactions can be utilized to introduce the desired monosaccharide or oligosaccharide residues into the side of the backbone chain of the polysaccharide. FIG. 1 (FIG. 1A-FIG. 1E) and FIG. 2 (FIG. 2A-FIG. 2E) illustrates reaction schemes in which lactose or galactose is introduced, as examples of the monosaccharide or oligosaccharide. It is to be noted that, in a case where monosaccharide or oligosaccharide is introduced so that the monosaccharide or oligosaccharide residues are directly bound to the backbone chain of the polysaccharide, the resultant polysaccharide-carbon nanotube is relatively weak in its recognition ability for proteins or cell membranes. Therefore, monosaccharide or oligosaccharide residues are preferably introduced so that there is present a linker between the polysaccharide and the monosaccharide or oligosaccharide residue. In Figs. L's denote the respective atomic groups which serves as a linker.

FIG. 1 illustrates a process for the introduction of monosaccharide or oligosaccharide into schizophyllan, a kind of β-1,3-glucan, as an example of polysaccharide, in which there is utilized glucose, inherently present in the side chains of the starting polysaccharide, and the glucose moiety is subjected periodate oxidation followed by reductive amination. This process is particularly preferable in preparing the modified polysaccharide because monosaccharide or oligosaccharide residue can be introduced in a relatively easy manner without affecting the glucoside bonds of the backbone chain. For example, at least part of the side chain glucose is oxidized with sodium periodate resulting in the opening of the ring to produce an aldehyde (FIG. 1A, Ib), which is rendered to react with an amine derivative of saccharide to be introduced (FIG. 1B, Ic: aminoethyl lactoside) for reductive amination with a reducing agent such as sodium borohydride to produce saccharide-containing (lactose-containing) side chains (Example 2, FIG. 1B, Id). Alternatively, schizophyllan after the periodate oxidation (Ib) is subjected to reductive amination with aqueous ammonia to produce amino group-containing schizophyllan, followed by reaction with a lactone-containing saccharide derivative (FIG. 1C, Ie) thereby producing schizophyllan derivative having amide groups as linkers (FIG. 1C, If). Furthermore, schizophyllan after the periodate oxidation is rendered to react with an aminooxy group-containing saccharide derivative (FIG. 1D, Ig) or a hydrazone group-containing saccharide derivative (FIG. 1E, Ij) to produce schizophyllan derivatives having the respective functional groups (FIG. 1D, Ii and FIG. 1E, Ik, respectively).

FIG. 2 illustrates another process for obtaining the modified polysaccharide for use in the present invention, in which monosaccharide or oligosaccharide residues are introduced directly into the glucoside bonds of the backbone chain of curdlan, as an example of polysaccharide inherently having no side chains. In this case curdlan (FIG. 2A, IIa) is subjected bromination and azide formation to prepare azido-curdlan (FIG. 2A, IIc), which undergoes hydrogenation to form aminated curdlan (FIG. 2A, IId). The aminated curdlan is then rendered to react with a lactone-containing saccharide derivative (FIG. 2B, IIe) or a brominated saccharide derivative (FIG. 2C, IIg) to form saccharide-modified curdlan (FIG. 2B, IIf and FIG. 2C, IIh). It is possible for a brominated curdlan (FIG. 2A, IIb) to render to react with a thiol-containing saccharide derivative (FIG. 2D, IIi) to form a saccharide-modified curdlan (FIG. 2D, IIj). In addition, a reaction between a thiol-containing curdlan (FIG. 2E, IIn) and an active disulfide-containing saccharide derivative (FIG. 2E, IIo) also produces a saccharide-modified curdlan (FIG. 2E, IIp).

It is noted that the rate of monosaccharide or oligosaccharide to be introduced into the side of the backbone chain of the polysaccharide in the above-mentioned manner is preferably in the range of 2 to 10% based on the number (the total number) of the glucose (glucose residues) composing the backbone chain of the polysaccharide.

Example 1

Preparation of β-1,3-glucan (schizophyllan)

Triple helix schizophyllan was prepared in accordance with the conventional method as described in the literature reference: Schizophyllam commune. Fries (ATCC 44200) available from ATCC (American Type Culture Collection) was subjected to a stationary culture in a minimal medium for seven days. After removal of the cellular materials and insoluble residues, the supernatant was subjected to a supersonic treatment to yield schizophyllan with a triple helix structure having a molecular weight of 450000 [Gregory G. Martin, Michael F. Richardson, Gordon C. Cannon and Charles L. McCormick, Am. Chem. Soc. Poly. Prep. 1997, 38, 253 (Non-patent reference 17); Kengo Tabata, Wataru Ito, Takemasa Kojima, Shozo Kawabata and Akitra Misaki, Carbohydrate Res. 1981, 89, (2) (Non-patent reference 18)].

Example 2

Synthesis of Saccharide-Modified Schizophyllan

A saccharide-modified schizophyllan was synthesized in accordance with the reaction scheme as shown in FIG. 1. While there is shown, as an example, the synthesis of lactose-modified schizophyllan using aminoethyl lactoside, a similar method for synthesis can be applied to any aminoethyl-containing saccharide (monosaccharide or oligosaccharide). Lactose-modified schizophyllan is synthesized specifically as follows: 234 mg of the schizophyllan 234 g, as prepared by Example 1 with a molecular weight of 450000, was dissolved in 234 ml of distilled water. To the resultant was added slowly a solution of sodium periodate 23.7 mg (0.3 equivalence per the side chain glucose) dissolved in a small amount of distilled water, while keeping the temperature at 4° C. with stirring. The reaction solution was subjected to dialysis through a membrane (with an exclusion limit of 8000), followed by addition of 0.64 g of aminoethyl lactone. The mixture was stirred for two days at room temperature. The reaction solution was lyophilized and the resultant white solid was dissolved in 35 ml of dimethyl sulfoxide. The resultant solution was added with aminoethyl lactoside (cf. the literature reference by Sun et al. for the synthesis thereof) and a small amount of potassium carbonate, followed by stirring for two days. Following the addition of sodium borohydride, the resultant was stirred for two days and then subjected to reprecipitation with 500 ml of ethanol. The thus formed precipitate was isolated filtration, followed by repeated washing with methanol and acetone. After the precipitate was suspended in distilled water, the insolubles were filtered off. The resultant solution was subjected to dialysis through a membrane (exclusion limit: 8000) followed by lyophilization to yield lactose-modified schizophyllan [Sun, Xue-Long; Faucher, Keith M.; Houston, Michelle; Grande, Daniel; Chaikof, Elliot L. J. Am. Chem. Soc. 2002, 124, 7258 (Non-patent reference 19)].

Example 3

Characterization of Saccharide-Modified Schizophyllan

The saccharide-modified schizophyllan prepared in Example 2 was determined for the molecular weight by gel exclusion chromatography (column: TSK gel-α-4000, eluent: [LiBr]=20 mM): The saccharide-modified schizophyllan had a molecular weight substantially equal to that of the starting schizophyllan, suggesting that the chemical modification caused almost no cleavage of the backbone chain.

With respect to the saccharide-modified schizophyllan, the saccharide introduction rate (n) is calculated from the nitrogen content (x) obtained by elemental analysis, and the saccharide introduction rate (n) for each sample was found to be 0.14 based on the formula as shown below.

In the case of the modified schizophyllan as prepared in Example 2, the relation between the saccharide introduction rate, the rate of substitution of side chain glucose residue (present in a ratio of one per every three backbone chain glucose residues) by the modification saccharide and the nitrogen content can be expressed by the following formula, wherein N, C, H and O denote the atomic weight of nitrogen, carbon, hydrogen one oxygen, respectively. It is also noted that the value of n corresponds to the n as shown in the compound Id in FIG. 1B.

$$X=2\times N\times n/\{(24\times C+40\times H+20\times O)(1-n)+(52\times C+92\times H+2\times N+40\times O)n\}$$

By rearranging this formula for n and substituting the values of nitrogen content (X: rate by weight) obtained by elemental analysis and the atomic weight of the respective atoms, the saccharide introduction rate (n) was calculated to be 0.14 (14 mol %) as follows:

$$N = -(24 \times C + 40 \times H + 20 \times O) \times$$
$$X/(28\times C\times X+52\times H\times X-2\times N\times X-2\times N+20\times O\times X) =$$
$$-(24 \times 12.01 + 40 \times 1.008 + 20 \times 16.00) \times$$
$$0.005218569/(28 \times 12.01 \times 0.005218569 +$$
$$52 \times 1.008 \times 0.005218569 - 2 \times 14.01 \times 0.005218569 -$$
$$2 \times 14.01 + 20 \times 16.00 \times 0.005218569) = 0.138 \,(ca.\ 0.14)$$

In schizophyllan the side chain glucose residues are present in a ratio of one per every three backbone chain glucose residues. Lactose was introduced in the rate of 13.8% to such side chains. Thus, the introduction rate of lactose per the total number of the glucose (residues) composing the polysaccharide backbone chain is (13.8/3) %, i.e. 4.6%.

Example 4

Preparation of Saccharide-Modified Schizophyllan-Carbon Nanotube Complex

Carbon nanotubes were pretreated as follows: The single-walled carbon nanotubes (SWNTs) 10 mg, available from Carbon Nanotechnologies Inc. (Texas, USA), was added with 50 ml of mixed acid (nitric acid:sulfuric acid=1:3 (v/v)), followed by a supersonic treatment (50 kHz) for 2-3 hours. The solution was subjected to a filtration. The residues were neutralized with 10 mM sodium hydroxide, and then sufficiently washed with distilled water until the filtrate became neutral. The residues were recovered prior to complete drying, and dispersed in 100 ml of distilled water. The dispersion was subject to centrifugation (13900 r.p.m.) for hour at 20° C., to remove the supernatant. The precipitate was added with 10 ml of distilled water, and then subject to a centrifugation. The thus obtained nanotubes were dispersed in 10 ml of water and subjected to centrifugation of 2780 r.p.m. for ten minutes. The undispersed nanotubes were recoved as the precipitate. The upper supernatant was used as the dispersion of carbon nanotube in the subsequent experiments. It was checked that the carbon nanotube in the dispersion is of a concentration of about 0.1 mg/ml, on UV-vis spectrometry, and has a length of 1-3 u, by microscopic observation.

The thus pretreated aqueous dispersion of the carbon nanotube (0.1 mg/ml, 250 μl) was admixed with a solution of the saccharide-modified schizophyllan in dimethyl sulfoxide (5 mg/ml, 5 μl), followed by an incubation for two days at 50° C. It is noted that the saccharide-modified was in large excess over the single-walled carbon nanotube. After two days, the saccharide-modified schizophyllan-carbon nanotube complex was recovered as a black precipitate by centrifugation (7000 r.p.m., 60 min.) to remove the surplus saccharide-modified schizophyllan contained in the supernatant. The treatment was repeated three times to refine the saccharide-modified schizophyllan-carbon nanotube complex.

Example 5

Figure 3:
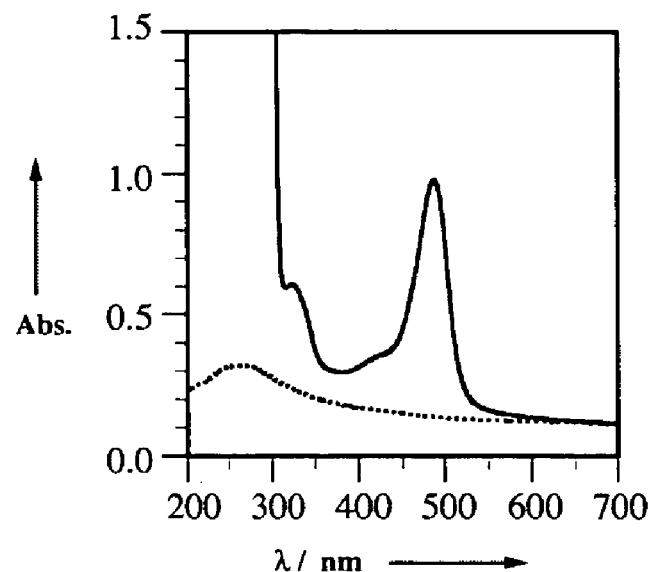
FIG. 3 shows a UV spectrum of lactose-modified schizophyllan (solid line, Example 6) and a UV spectrum of the same polysaccharide after having being treated with the phenol-sulfuric acid method (broken line, Example 6).
Figure 4:
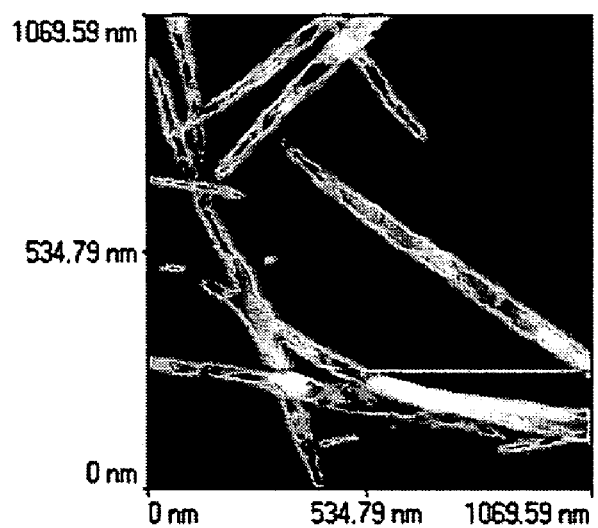
FIG. 4 shows an atomic force micrograph of single-walled carbon nanotubes (Example 8).

Confirmation of the Saccharide-Modified Schizophyllan-Single-Walled Carbon Nanotube Complex Formation, by UV-Vis Spectrophotometry The black precipitate obtained by the centrifugation in Example 4 was dissolved in deionized water (350 ml) for UV-vis spectrophotometric measurement. There was observed the scattering of light derived from the carbon nanotube over the entire wavelength range (700-200 nm) as well as an absorption band at a short wavelength (280 nm) assigned to the aromatic ring, proving that the carbon nanotubes were contained in the black precipitate. As an example of the spectra actually obtained, there is shown a spectrum for the lactose-modified schizophyllan-carbon nanotube complex in FIG. 3, solid line.

Example 6

Confirmation of the Saccharide-Modified Schizophyllan-Single-Walled Carbon Nanotube Complex Formation, by the Phenol Sulfuric Acid Method The black precipitate obtained by the centrifugation in Example 4 was dispersed in deionized water (500 μl). After adding a 5% aqueous solution of phenol (500 μl) and then concentrated sulfuric acid (2500 μl), the mixture was allowed to stand at room temperature over twenty minutes, to develop the color of the sugar chain. As the resulting solution was measured for UV spectrum, there was verified a sharp absorption band at around 490 nm. The absorption band at 490 nm is an absorption band distinctive of the color development in a saccharide due to the phenol-sulfuric acid method, and it is thus evidenced that the black precipitate contained components derived from the saccharide chains. Taking the results of Example 5 into consideration, it is comprehended that the black precipitate was composed of both the sugar chain and the carbon nanotube. As an example of the spectra actually obtained, there is shown a spectrum for the lactose-modified schizophyllan-carbon nanotube complex in FIG. 3, broken line [Hodge, J. E. and Hofreiter, B. T., Method in Carbohydrate Chemistry, 1, 338 (1962) (Non-patent reference 20)].

Example 7

Confirmation of the Complex Formation, by Thermogravimetric Analysis

Thermogravimetric analysis of the black precipitate obtained by the centrifugation in Example 4 showed a decrease in mass derived from the sugar chain component as well as a decrease in mass derived from the carbon nanotube component verifying that the black precipitate is composed of both the sugar chain and the carbon nanotube.

Figure 14:
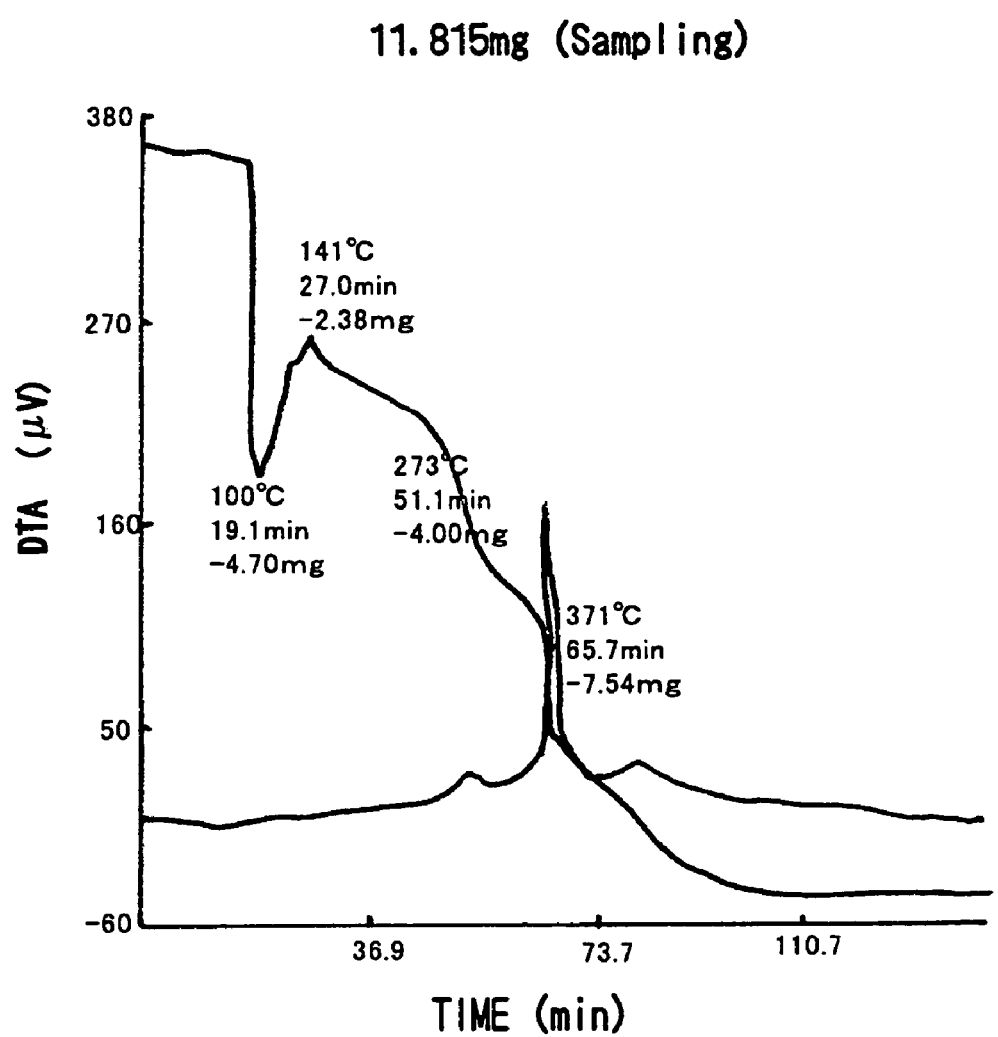
FIG. 14 shows the results of thermogravimetric analysis of a complex of the present invention (Example 11).

FIG. 14 shows the results of the DTA/TG analysis. The rate of temperature rise was 5° C./minute. The first decrease (at around 73° C.) is derived from the decomposition of the modified schizophyllan and the second decrease (the gradual decrease starting from around 371° C.) is derived from the decomposition of the carbon nanotube.

Example 8

Confirmation of the Complex Formation, by Atomic Force Microscopy

Figure 5:
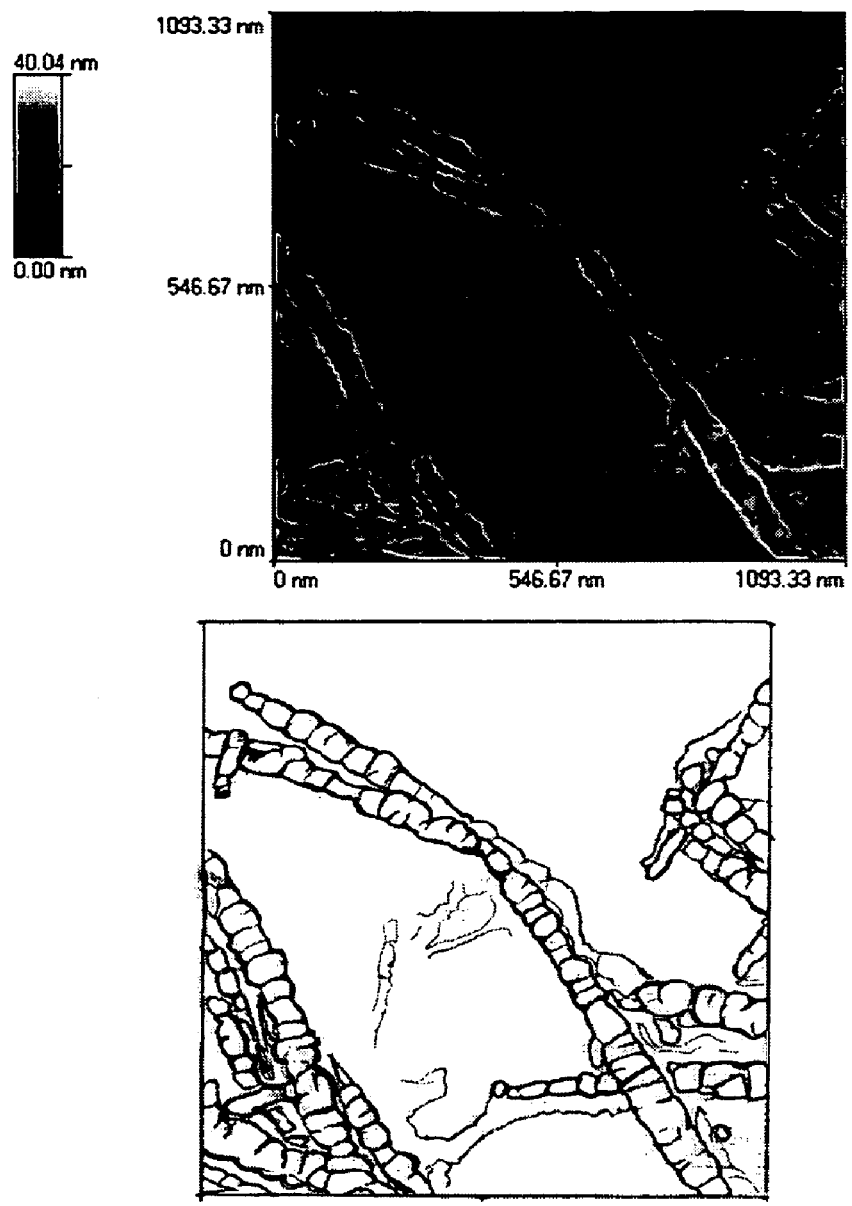
FIG. 5 shows an atomic force micrograph of a complex of schizophyllan and single-walled carbon nanotube.

An aqueous solution of the black precipitate obtained by the centrifugation in Example 4 was cast on a quartz substrate for direct observation by an atomic force microscope. Firstly, observation was made of free carbon nanotubes and it indicated quite smooth surface without any distinctive structure. By contrast, observation of the lactose-modified schizophyllan-carbon nanotube complex indicated distinctive a striped pattern, on the surface of the carbon nanotube, running transversely with respect to the long axis of the carbon nanotube (FIG. 5). For FIG. 5, there is concurrently given, for easy understanding, a handwritten drawing made by tracing the micrograph. Such striped pattern is also reported in a system for solvilizing carbon nanotubes in which non-modified schizophyllan is used (Non-patent reference 1), and indicates that the schizophyllan derivative wraps the carbon nanotube in a spiral manner. A similar striped pattern was also observed in a case where the carbon nanotube is coated with the mannose-modified schizophyllan.

Example 9

Evaluation of Specific Interaction Between the Saccharide-Modified Schizophyllan-Carbon Nanotube Complex and Lectin, by Surface Plasmon Resonance Evaluation was made of the interaction between the saccharide-modified schizophyllan-carbon nanotube complex and lectin, by the surface plasmon resonance method using a lectin-modified gold substrate. A commercially available chip (Sensor Chip SA, BIACORE) was set in BIACORE biosensor, followed by washing with Tris buffer (1 mM, pH7.2) for several minutes. On the surface of the chip was fixed avidin through carboxymethyl dextran. A solution of a biotin-labeled lectin was run into a channel to fix the lectin on the surface of the sensor chip through the strong avidin-biotin interaction. Using the lectin-modified gold substrate, the binding experiments were carried out as follows. Seven different types of lectins are used, i.e. used are $RCA_{120}$ (β-galactoside selective), WGA (β-N-acetylglucosamide selective), ConA (α-mannoside and α-glucoside selective), LCA (α-mannoside and α-glucoside selective), DBA (N-acetylgalactosamide selective), PHA-E4 (N-acetylgalactosamide selective), and UAE-1 (α-fucoside selective).

Figure 6:
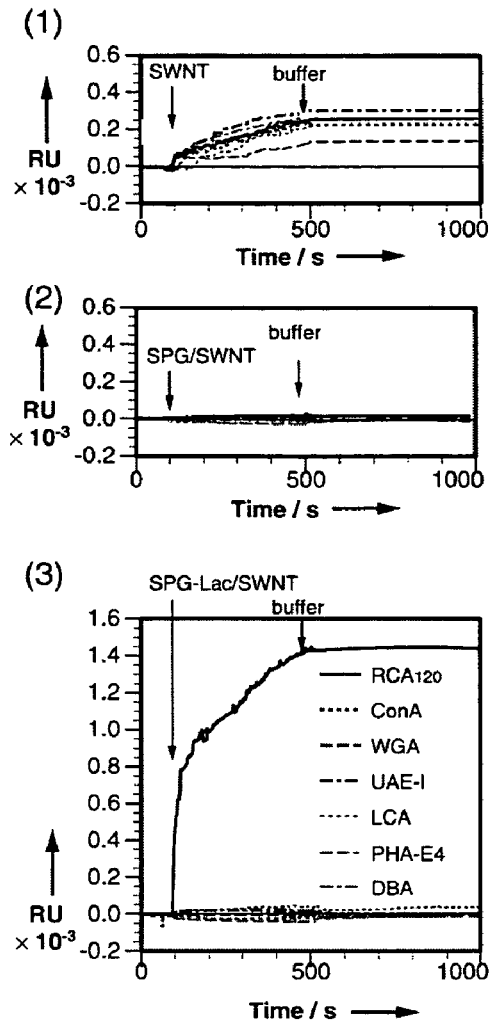
FIG. 6 shows the binding behavior, based on surface plasmon resonance, of (1) single-walled carbon nanotube, (2) complex of schizophyllan and single-walled carbon nanotube, and (3) a complex of lactose-modified schizophyllan and single-walled carbon nanotube onto a lectin-fixed gold substrate (Example 9).

Firstly, when free carbon nanotube (SWNT) was suspended in Tris buffer and the suspension was run through the channel (FIG. 6 (1)), it was found that the single-carbon nanotube nonspecifically binds to all types of lectin-modified gold substrates. Detachment experiments were carried out of the bound single-walled carbon nanotube from the lectin-fixed gold substrates, but there was observed no removal of the single-walled carbon nanotube when an acidic, basic, or guanidine hydrochloride-containing buffer was run into the channel. Removal of the single-walled carbon nanotube was observed only when a surfactant-containing buffer was used, indicating that the nonspecific binding is due to a hydrophobic interaction. Thus; it can be concluded that the single-walled carbon nanotube is highly hydrophobic, and interacted with the hydrophobic sites of the lectin.

Next, in the case of the schizophyllan-carbon nanotube complex (SPG/SWNT) (FIG. 6 (2)), almost no binding was observed with any type of lectin. It is considered that the hydrophobic surface of the single-walled carbon nanotube is covered by the polymer wrapping of schizophyllan and hence the nonspecific adsorption due to the hydrophobic interaction is completely blocked. Such suppression of nonspecific adsorption of proteins is quite important in the utilization in vivo of the single-walled carbon nanotube.

Figure 7:
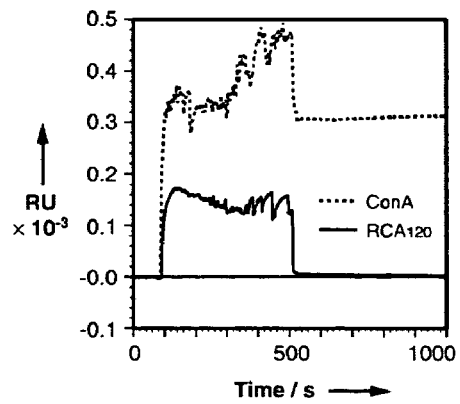
FIG. 7 shows the binding behavior, based on surface plasmon resonance, of a complex of mannose-modified schizophyllan and single-walled carbon nanotube onto a lectin-fixed gold substrate (Example 9).

Lastly, in the case of the lactose-modified schizophyllan-carbon nanotube complex (SPG-Lac/SWNT) (FIG. 6 (3)), while strong binding was ascertained only with the RCA-modified gold substrate, no binding was ascertained with the other types of lectins. $RCA_{120}$ is a lectin which specifically interacts with a lactose residue, and it was proved that the lactose-modified schizophyllan-single-walled carbon nanotube complex binds to the gold substrate through the specific interaction between the lactose-residue in the complex and $RCA_{120}$. More specifically, it can be concluded that thanks to the polymer wrapping by the lactose-modified schizophyllan, the single-walled carbon nanotube, which is inherently no lectin-recognizing, has been provided with the ability of selective binding to the specific lectin. Similarly, in the case of the mannose-modified schizophyllan-single-walled carbon nanotube complex, it interacted only with a specific type of lectin, i.e. ConA, and did not interact with $RCA_{120}$ (FIG. 7).

It is thus evidenced from the above-mentioned results that the use of a saccharide-modified schizophyllan-single-walled carbon nanotube complex enables selective binding of lectin to the complex, due to the ability of the lectin to recognize the saccharide chain of the complex. Recently trials have been active to utilize carbon nanotubes in sensor elements. For example, it has been reported that a sensor element composed of electrodes bridged by carbon nanotubes exhibits a large change in electrical resistance depending upon a substance (e.g. NO) adsorbed on the carbon nanotubes (Non-patent reference 5). Taking advantage of the ability of the carbon nanotube complex of the present invention to recognize a specific type of protein, it is expected to develop a sensor for specifically detecting a saccharide-recognizing protein, virus or toxin.

Example 10

Direct Observation of Interaction of Lactose-Modified Schizophyllan-Single-Walled Carbon Nanotube Complex with Lectin, Using Atomic Force Microscope Direct observation using atomic force microscope (AFM) was conducted of interaction of the saccharide-modified schizophyllan-single-walled carbon nanotube complex with lectin.

Figure 8:
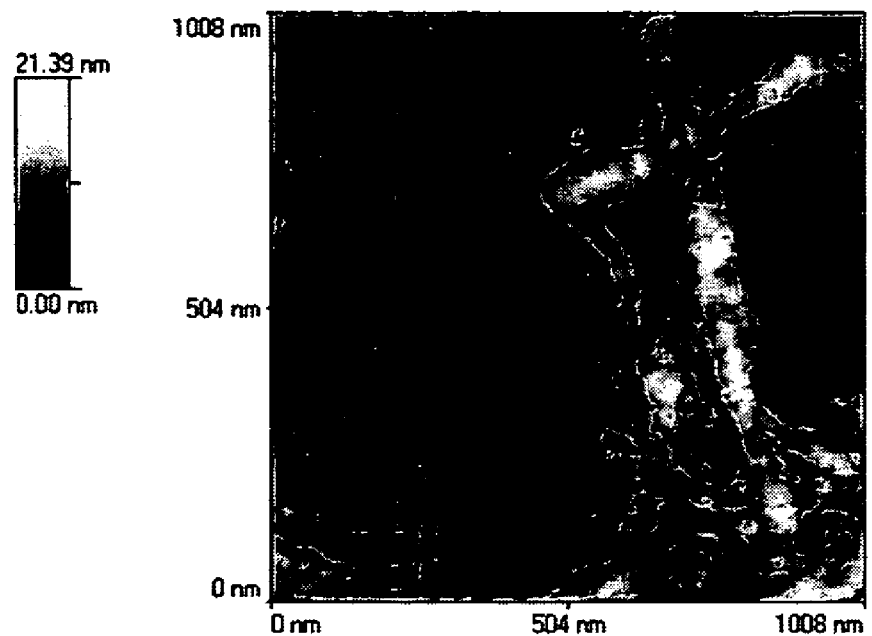
FIG. 8 shows an atomic force micrograph of a complex of lactose-modified schizophyllan and single-walled carbon nanotube, after the incubation with $RCA_{120}$ lectin (Example 10).
Figure 9:
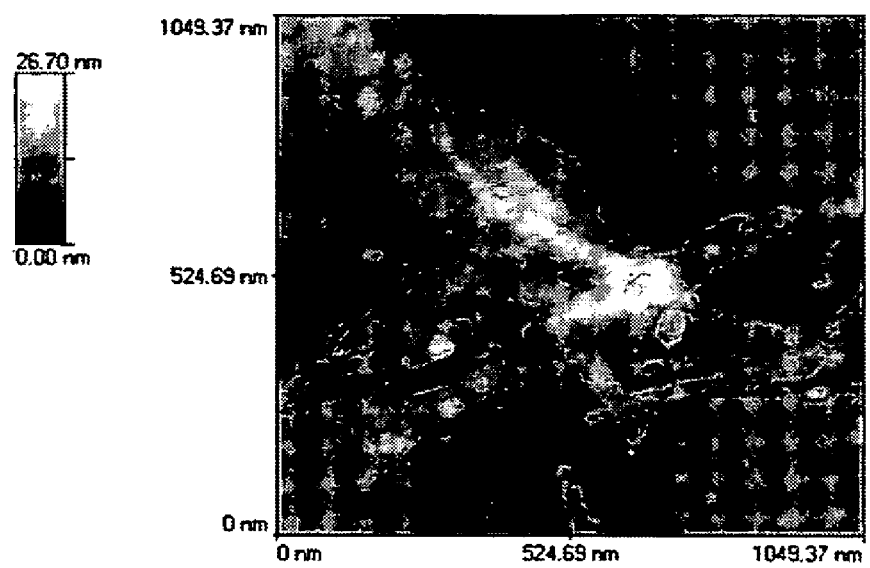
FIG. 9 shows an atomic force micrograph of a complex of lactose-modified schizophyllan and single-walled carbon nanotube, after the incubation with PNA lectin (Example 10).
Figure 10:
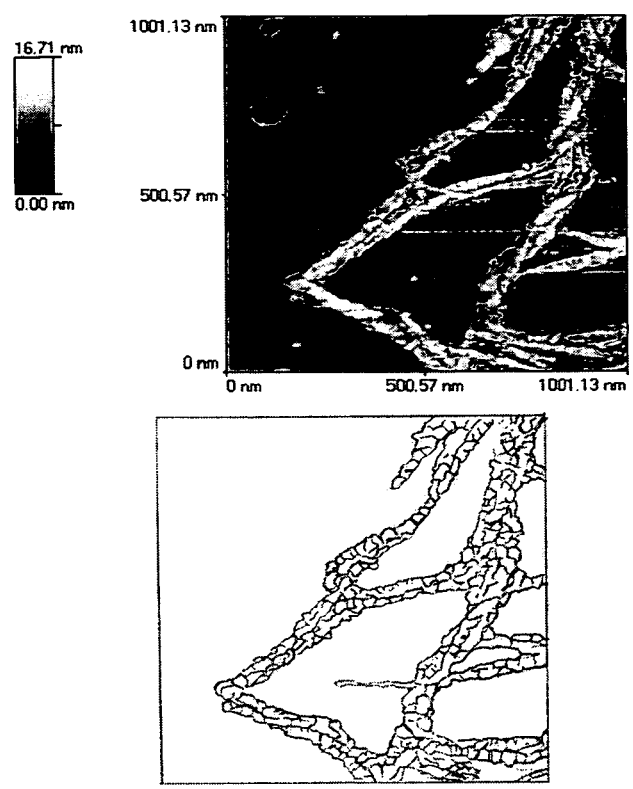
FIG. 10 shows an atomic force micrograph of a complex of lactose-modified schizophyllan and single-walled carbon nanotube, after the incubation with ConA lectin (Example 10).
Figure 11:
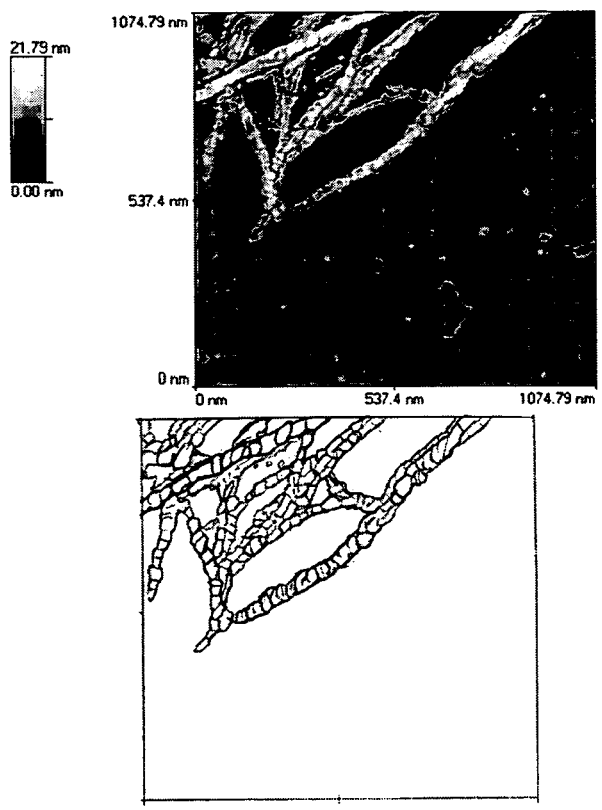
FIG. 11 shows an atomic force micrograph of a complex of lactose-modified schizophyllan and single-walled carbon nanotube, after the incubation with WGA lectin (Example 10).

The saccharide-modified schizophyllan-single-walled carbon nanotube complex was incubated together with various types of lectin in Tris-HCl buffer (1 mM, pH7.2, $[CaCl_2]$ and $[MnCl_2]$=10 μM) at room temperature for 15 minutes. The saccharide-modified schizophyllan-single-walled carbon nanotube was recovered by removing the unbound lectin by centrifugation (7000 r.p.m., 2 times). An embodiment with respect to lactose-modified schizophyllan-single-walled carbon nanotube complex will be explained in the following: Examination of the recovered lactose-modified schizophyllan-single-walled carbon nanotube complex on atomic force microscopy (AFM) revealed that there were observed minute particles assembled on the surface of the lactose-modified schizophyllan-single-walled carbon nanotube complex only when there was used lactose-recognizing lectin such as $RCA_{120}$ or PNA (cf. FIG. 8 and FIG. 9). It can be reasonably elucidated that such lactose-recognizing lectin recognizes lactose residues present on the surface of the lactose-modified schizophyllan-single-walled carbon nanotube complex and binds to the surface of the complex in a highly-densed manner, thereby hiding the stripe pattern inherently exhibited by the lactose-modified schizophyllan-single-walled carbon nanotube complex. No assembly of the protein was observed with respect to non-lactose-recognizing lactin, ConA or WGA (FIG. 10 and FIG. 11), supporting that the lectin binding as observed in $RCA_{120}$ or PNA is definitely based on the selective sugar chain-lectin interaction. With respect to FIGS. 10 and 11, there are concurrently given, for easy understanding, handwritten drawings made by tracing the micrographs.

Example 11

Figure 12:
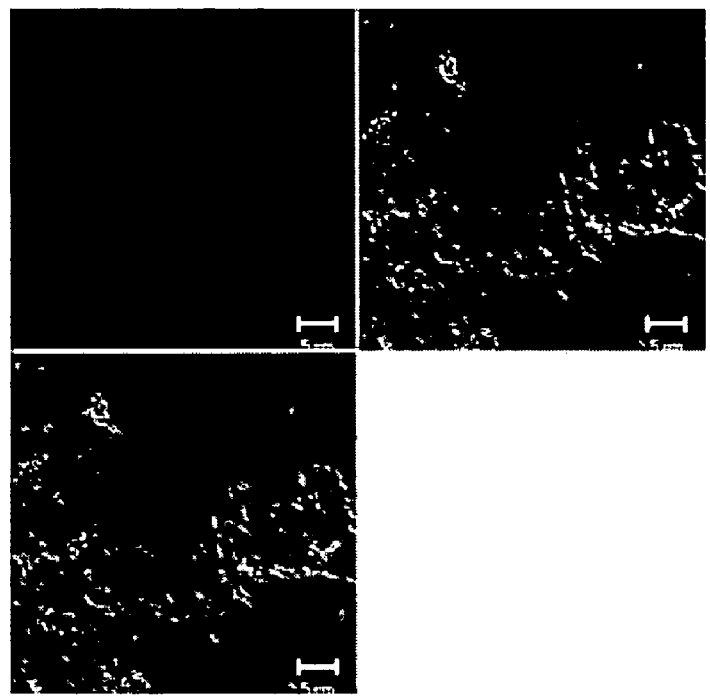
FIG. 12 shows confocal laser micrographs of a complex of lactose-modified schizophyllan and single-walled carbon nanotube, after the incubation with FITC-$RCA_{120}$ lectin (Example 11): fluorescence image (upper-left), transmitted light image (upper-right), and registered image of the two images (lower-left).
Figure 13:
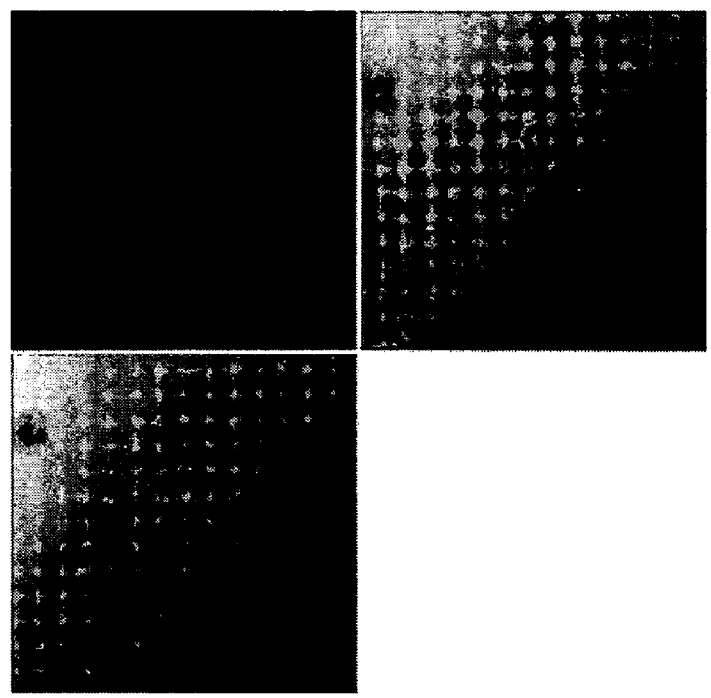
FIG. 13 shows confocal laser micrographs of a complex of lactose-modified schizophyllan and single-walled carbon nanotube, after the incubation with FITC-ConA lectin (Example 11): fluorescence image (upper-left), transmitted light image (upper-right), and registered image of the two images (lower-left).

Direct Observation of Interaction of Saccharide-Modified Schizophyllan-Single-Walled Carbon Nanotube Complex with Fluorescence-Labeled Lectin, Using Confocal Laser Microscope Lectin-recognizing specific ability of the saccharide-modified schizophyllan-single-walled carbon nanotube complex was also evidenced by the observation using a confocal laser microscope. In a similar manner as in the aforementioned sample preparation for AFM, the samples of the complex were rendered to interact with various types of fluorescein isothiocyanate (FITC)-labeled lectin, followed by centrifugation to recover the saccharide-modified schizophyllan-single-walled carbon nanotube complex. An embodiment with respect to lactose-modified schizophyllan-single-walled carbon nanotube complex will be explained in the following: Observation of the lactose-modified schizophyllan-single-walled carbon nanotube complex revealed that, in the case of using FITC-$RCA_{120}$ as lectin, the locations of the lactose-modified schizophyllan-single-walled carbon nanotube complex shown by the transmitted-light image (FIG. 12, upper-light) completely overlaps with the locations of FITC-$RCA_{120}$ shown by the fluorescence image (upper-right) as evidenced by the registered image (FIG. 12, lower-left), demonstrating the binding between the lactose-modified schizophyllan-single-walled carbon nanotube complex and FITC-$RCA_{120}$. In the case of using FITC-ConA, there was observed almost no fluorescence image and no registered image with the Lac-modified SPG-SWNT complex image. In the case of the mannose-modified schizophyllan-single-walled carbon nanotube, the locations of the complex shown by the transmitted-light image completely registers with those of FITC-ConA shown by the fluorescence image, demonstrating that the mannose-modified schizophyllan-single-walled carbon nanotube complex interact selectively with FITC-ConA (FIG. 13).

Example 12

Direct Observation Of Interaction Between Rhodamine-Modified Schizophyllan-Saccharide-Modified Schizophyllan-Single-Walled Carbon Nanotube Ternary Complex and Lectin-Modified Agarose Gel Beads by Confocal Microscopy Using lectin-modified agarose gel beads, an evaluation experiment was carried out to examine whether the saccharide-modified schizophyllan-single-walled carbon nanotube complex recognize cells through the interaction with a protein present on the cell surface. Lectin-modified agarose gel bead is of the same size as cell size and provided, on the surface thereof, a protein which is capable of recognizing a specific saccharide. Thus, the beads are now widely-used artificial cells as cell mimics in molecular recognition assay. The present assay was carried out by using rhodamine-modified schizophyllan-saccharide-modified schizophyllan-single-walled carbon nanotube ternary complex. The complex is a carbon nanotube complex having lectin-recognizing ability based on the saccharide-modified schizophyllan as well as fluorescent ability based on the rhodamine-modified schizophyllan.

$RCA_{120}$ lectin-modified agarose gel beads and the ternary complex were rendered to interact with each other in Tris buffer, followed by repeated washing of the $RCA_{120}$ lectin-modified agarose gel beads with Tris buffer. Confocal microscopic observation indicated fluorescent particles on the surfaces of the $RCA_{120}$ lectin-modified agarose gel beads, demonstrating that the ternary complex binds to the surfaces of the $RCA_{120}$ lectin-modified agarose gel beads. In the case where ConA-modified agarose gel beads were used, there are observed no fluorescent substances on the surfaces of the gel beads, supporting the fact that the ternary complex binds to the gel surface due to the specific saccharide-lection interaction. The present assay using the artificial cells strongly suggests that the saccharide-modified schizophyllan-single walled carbon nanotube complex will recognize specific cells by the specific interaction with a saccharide-recognizing protein present on the cell surface.

INDUSTRIAL APPLICABILITY

In accordance with the present invention there can be obtained a polysaccharide-carbon nanotube complex without damaging the characteristic features of the carbon nanotube. The complex of the present invention possesses biocompatibility based on the polysaccharide and also exhibits selective binding with specific proteins or cells. Thus, the complex is expected to apply in a sensor element for detecting, for example, proteins such as lectin, toxins (e.g. Vero toxin produced by O157 or Cholerae toxin produced by Vibrio cholerae), or influenza virus.

The invention claimed is:

1. A complex which comprises a carbon nanotube and a modified polysaccharide having a backbone chain with the side thereof being introduced with monosaccharide or oligosaccharide residues, wherein the polysaccharide is β-1,3-glucan and wherein the monosaccharide or oligosaccharide is selected from galactose, N-acetylgalactosamine, N-acetylglucosamine, mannose, fucose, sialic acid, and lactose.

2. A complex as claimed in claim 1, wherein the β-1,3-glucan is selected from schizophyllan, lentinan and scleroglucan.

3. A complex as claimed in claim 1, wherein the carbon nanotube is single-walled carbon nanotube.

4. A method for detecting cells or proteins comprising:
detecting binding of a sensor element with cells or proteins, the sensor element comprising a complex comprising a carbon nanotube and a modified polysaccharide having a backbone chain with the side thereof being introduced with monosaccharide or oligosaccharide residues.

5. A method as claimed in claim 4, wherein the monosaccharide or oligosaccharide is selected from galactose, N-acetylgalactosamine, N-acetylglucosamine, mannose, fucose, sialic acid, and lactose.

6. A method as claimed in claim 4, wherein the method includes detecting binding of the sensor element with a protein, and wherein the protein is lectin.

7. A process for producing a complex of a carbon nanotube and a modified polysaccharide having a backbone chain with the side thereof being introduced with monosaccharide or oligosaccharide residues, the monosaccharide or oligosaccharide being selected from galactose, N-acetylgalactosamine, N-acetylglucosamine, mannose, fucose, sialic acid, and lactose, which process comprises the steps of admixing a solution of the modified polysaccharide dissolved in an aprotic polar solvent or a strong alkali solution with an aqueous dispersion of the carbon nanotube, and incubating the mixture.

8. The process of claim 7, wherein the polysaccharide is β-1,3-glucan.

\* \* \* \* \*